United States Patent [19]

Aanstoot et al.

[11] 4,412,220

[45] Oct. 25, 1983

[54] DIGITAL SCAN CONVERTER

[75] Inventors: Jan Aanstoot, Enter; Bernard H. M. Oude Elberink, Oldenzaal, both of Netherlands

[73] Assignee: Hollandse Signaalapparaten B.V., Hengelo, Netherlands

[21] Appl. No.: 251,675

[22] Filed: Apr. 6, 1981

[30] Foreign Application Priority Data

Apr. 14, 1980 [NL] Netherlands ................ 8002171

[51] Int. Cl.$^3$ .............................................. G01S 7/44
[52] U.S. Cl. .................................................. 343/55 C
[58] Field of Search ............... 343/55 C, 5 DP, 5 VQ, 343/6 TV; 340/706

[56] References Cited

U.S. PATENT DOCUMENTS

| 3,810,174 | 5/1974 | Heard et al. | 343/55 C X |
| 3,821,735 | 6/1979 | Lasoff et al. | 343/5 DP |
| 3,838,420 | 9/1974 | Heard et al. | 343/5 SC |
| 4,165,506 | 8/1979 | Brands et al. | 340/706 |

OTHER PUBLICATIONS

J. Gietema, "A Digital Scan Converter for Radar Pictures", Philips Telecommunication Review, vol. 37, No. 2, May 1979, pp. 64–70.

Primary Examiner—Maynard R. Wilbur
Assistant Examiner—K. R. Kaiser
Attorney, Agent, or Firm—James J. Cannon, Jr.

[57] ABSTRACT

A digital scan converter is provided with a memory, each cell of which contains brightness data for presenting a corresponding video signals on a raster scan display at positions corresponding with the respective cells; a logical unit for supplying, in response to the applied video signals and the brightness data stored in memory, new brightness data overwriting that stored in memory; an address conversion circuit for converting the addresses established in polar coordinates into addresses expressed in Cartesian coordinates to store the new brightness data in memory; and with a circuit connected to the memory for reading out the brightness data and for presenting corresponding video signals on the raster scan display. To renew the stored brightness data synchronously with the radar scans such that a prefixed persistence appears on the raster scan display, the digital scan converter comprises a control unit for supplying persistence data and azimuth values to process the persistence data and a control code register for storing the persistence data in intervals between successive radar scans. Furthermore, in said interval the latter azimuth values are supplied to the address conversion circuit for generating the addresses of the memory cells and the contents of said memory cells are adapted to the persistence data in the control code register by means of the logical unit communicating with said control code register.

4 Claims, 4 Drawing Figures

DIGITAL SCAN CONVERTER

BACKGROUND OF THE INVENTION

1. Field of the Invention

The invention relates to a digital scan converter for a pulse radar apparatus provided with: a random-access memory, each cell of which containing brightness data; a circuit connected to the memory for reading out the brightness data and for presenting corresponding video signals on a raster scan display at positions unit for supplying persistence data and address information to process the persistence data; switching means for passing either radar video signals or the persistence data; and a logical unit for supplying, in response to the radar video signals and the persistence data, respectively, and to the brightness data stored in memory, new brightness data overwriting that stored in memory, whereby the memory positions are determined by an address conversion circuit which converts the radar video addresses and the persistence data addresses established in polar coordinates by the pulse radar apparatus and the control unit, respectively, into addresses expressed in Cartesian coordinates.

2. Description of the Prior Art

Such a digital scan converter is known from the U.S. Pat. No. 4,165,506. This converter contains a timing unit, which delivers brightness-reducing command signals at such fixed instants of time, that a persistence is obtained resembling that of a long-persistence phosphor on the display. The addresses pertaining to these command signals are generated in a pseudo-random sequence to effect a uniform reduction in brightness on the display. The present invention however has for its object to provide a digital scan converter, as set forth in the opening paragraph, attaining a persistence that resembles that of a PPI display, where the displayed radar scan shows a tangential persistence, i.e. a persistence proceeding in its direction of motion.

SUMMARY OF THE INVENTION

According to the invention the digital scan converter is characterised in that, to renew the stored brightness data, either simultaneously with a radar scan or between the generation of two successive radar scans, synchronously with a radar scan in obtaining a desired persistence on the raster scan display, the digital scan converter is provided with: a control code circuit for supplying, in response to signals from the control unit determining the conditions for and the frequency of the persistence data processing, a signal to indicate that only a radar scan must be presented on the display, a signal to indicate that simultaneously and in the same sequence therewith persistence data must be processed, or a signal to indicate that only persistence data must be processed in the same sequence as a radar scan; and a control code register in which the signals supplied via the switching means are supplemented with the output signals of the control code circuit.

The processing of persistence data is therefore oriented to the radar scan, i.e. the memory cells are subjected to a brightness-reducing process in the same sequence as that in which they were stored with radar data. This sequence thus describes, like the radar scan, a radius referred to as persistence scan hereinafter. By processing persistence data is here meant that a persistence scan is generated. The duration of the persistence is determined by the frequency at which such persistence scans are generated.

BRIEF DESCRIPTION OF THE DRAWINGS

The invention will now be explained with reference to the accompanying figures, of which

DESCRIPTION OF THE PREFERRED EMBODIMENT

Figure 1:
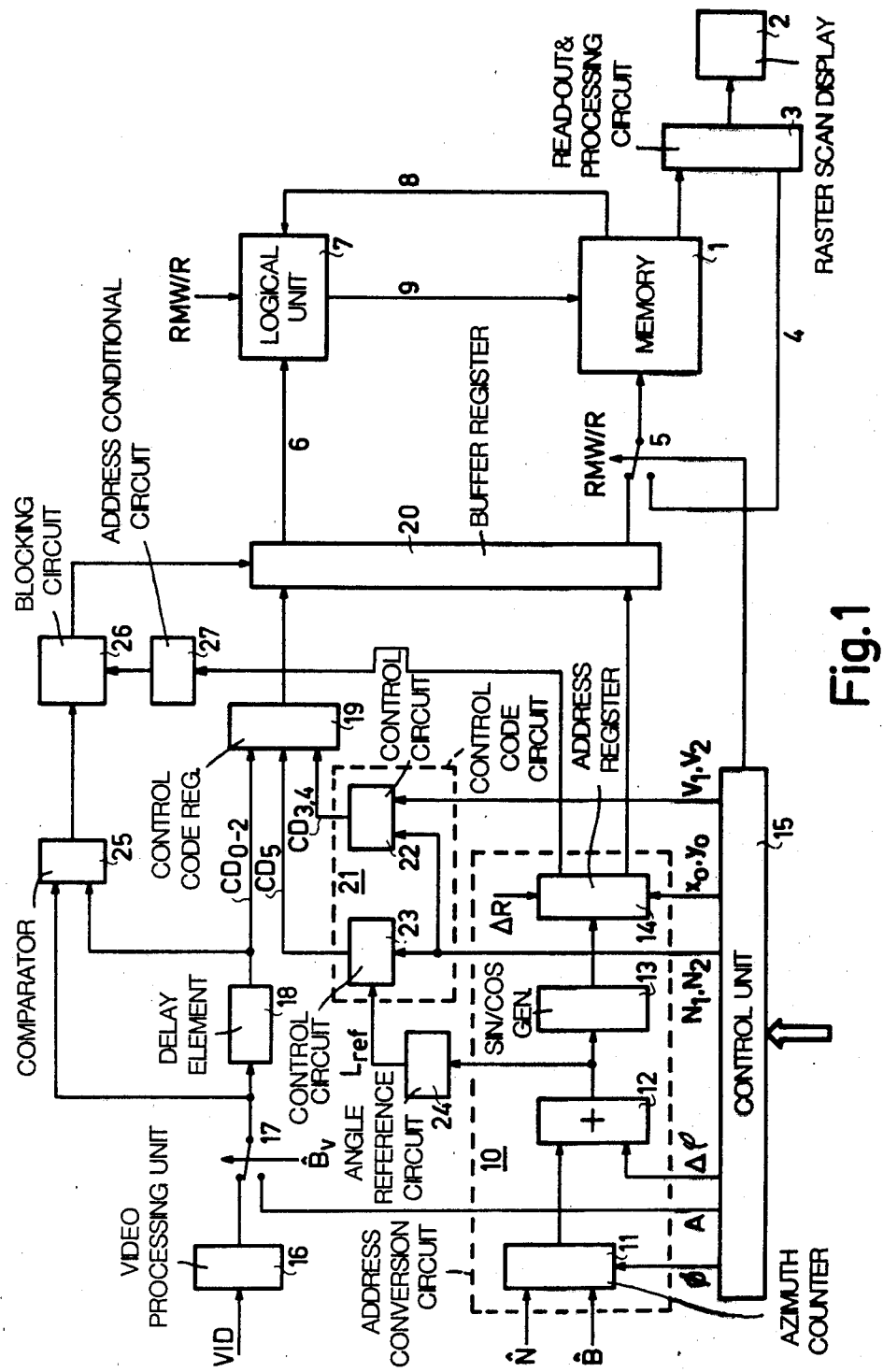
FIG. 1 is a block diagram of an embodiment of the digital scan converter according to the invention.

In FIG. 1 the random-access memory is denoted by 1. Each cell of this memory corresponds with a point of the raster of a raster scan display 2 and contains the information required for displaying a video signal at a corresponding position on the raster scan display. The memory-stored data is read out at such a frequency that a steady flicker-free picture is generated. A circuit 3 is thereto connected to memory 1 to read out the memory data, to process this data for the generation of video signals, and to present these video signals on display 2. Each memory cell comprises a given number of bit positions. The contents of such a memory cell determines the intensity at which radar video signals are presented on the raster scan display 2 at a position corresponding with the respective memory cell; the contents of a memory cell is hereinafter termed "brightness data". To read the brightness data out of memory, circuit 3 supplies the required memory addresses via line 4 and switch 5. Switch 5 will then be in the R(read) position, not shown in the figure. Memory 1 is fed alternately, via switch 5, with the address information of the video data processed in the scan converter and with the address information required for reading out memory 1. With switch 5 in the RMW(read/modify/write) position, as shown in the figure, the memory cell addressed is that of which the contents must be re-established. The video data processed in the scan converter is therefore fed to a logical unit 7 via line 6. This unit also receives the contents of the memory cell allocated by the associated address information. From the information applied to logical unit 7, the contents of the relevant memory cell is re-established via line 9. It should be noted that this does not imply that the contents of this memory cell differs per se from the foregoing contents of this cell.

As already stated, the contents of the memory cell consist of brightness data. The data to be processed in the scan converter, i.e. the data applied via line 6, need not contain any brightness data itself. This will however be so when this data consists of a quantised and digitised radar video signal. On the other hand, the data supplied via line 6 may consist of command signals, in consequence of which the brightness data in memory 1 has to be altered.

The memory cells of which the contents must be re-established are addressed from the address conversion circuit 10. This circuit converts the addresses established in polar coordinates in accordance with the radar scan pattern into addresses expressed in Cartesian coordinates. The address conversion circuit 10 thereto contains an azimuth counter 11, an adder 12, a sine/cosine generator 13 and an address register 14. The azimuth pulses B indicative of the radar antenna orientation and a pulse N indicative of an angular reference are supplied to azimuth counter 11. This counter supplies a signal representing the angular value $\phi$ between the direction in which the radar transmits the pulses and a selected reference direction. If desired, $\phi$ can be increased by a signal supplied to the azimuth counter, which signal represents the angular value $\emptyset$ for rotating the picture presented on the raster scan display. The angular value $\emptyset$ is supplied by a control unit 15. In adder 12 the angular value $\phi+\emptyset$ from the azimuth counter can be increased by $k.\Delta\phi$, where $k=0, 1, 2, \ldots$. The meaning of this will be discussed later. Control unit 15 also supplies the angular value $\Delta\phi$. The angular value $\phi+\emptyset+k.\Delta\phi$ is supplied to the sine/cosine generator which then produces the values $\sin(\phi+\emptyset+k.\Delta\phi)$ and $\cos(\phi+\emptyset+k.\Delta\phi)$ and sends these values to address register 14. After receiving the range increment count pulses $\Delta R$ and the radar coordinate values $x_o$, $y_o$ from control unit 15, this register supplies the memory addresses $$x=x_o+n.\Delta R. \cos(\phi+\emptyset+k.\Delta\phi) \text{ and } y=y_o+n.\Delta R. \sin(\phi+\emptyset+k.\Delta\phi),$$

where $n=0, 1, 2, \ldots, N$ and $N.\Delta R$ is the set radar range.

The video data, to which the brightness data in an addressed memory cell must be adapted, is quantised in the video processing unit 16 and supplied to control code register 19 via switching means 17 and delay element 18. The video data stored in control code register 19 is fed to logical unit 7 via buffer register 20. At the same time the corresponding memory address is stored in memory 1 via register 20.

The brightness data in memory 1 should not only be adapted to the results of the radar scans but should also be subjected at certain intervals to a brightness-reducing process. To effect this reduction, the video data is replaced by "persistence" data at a certain frequency. The processing of this persistence data is oriented to the radar scans; the memory cells are subjected to the brightness-reducing process in the same sequence as that in which they are stored with the radar data. This sequence generates a "persistence" scan. In principle, it should be possible to generate persistence scans between two successive radar scans. With this process the following situations occur:
1. the brightness-reducing process is executed several times each antenna revolution; several persistence scans should therefore be generated between two successive radar scans;
2. the brightness-reducing process is executed once each antenna revolution; this is preferably done simultaneously with the the processing of the radar data, in which case the generation of addresses for displaying radar scans and generating a persistence scan occur simultaneously;
3. the brightness-reducing is executed once each N antenna revolutions; this is preferably done on the $N^{th}$ revolution simultaneously with the radar scan.

Control unit 15 supplies signals which determine the frequency of generation of the persistence scans, viz. $N_1$: the number of persistence scans each antenna revolution, or $N_2$: the number of antenna revolutions in which a persistence scan must be generated. It will be clear that signals $N_1$ and $N_2$ determine the persistence period and hence the tail length of moving targets on the display. Control unit 15 also supplies the signal A, indicative of the persistence data. The persistence data takes the position of the radar video data on starting the brightness-reducing process. Finally, control unit 15 produces the "validity" signals, viz. $V_1,V_2=0,0$, indicating that no persistence scans may be generated, and $V_1,V_2=1,1$, indicating that the persistence scans may be generated in accordance with $N_1$ or $N_2$. The signals $\emptyset$, $\Delta\phi$, $(x_o, y_o)$, $N_1, N_2)$, A and $(V_1, V_2)$ from control unit 15 can be determined indirectly by a computer in communication with the control unit.

The control code register 19 receives the persistence data A via switching means 17 and delay element 18. Signal $B_v$ thereto sets switching means 17 in the position not shown in the figure; signal $B_v$ is the azimuth pulse delayed with respect to pulse B such that a radar scan can be performed during the delay period. In the embodiment in question, the video data or the persistence data taking the position thereof in the control code register 19, is indicated by bits $CD_{0-2}$. The bits $CD_{3-5}$ to be written in control code register 19 are from the control code circuit 21; this circuit comprises two control circuits 22 and 23. Control circuit 22 determines the bits $CD_{3,4}$ after receiving signals $(N_1,N_2)$ and $(V_1,V_2)$. In this embodiment these bits are 1,1 if the data in control code register 19 are only to refer to a radar scan to be processed; $CD_{3,4}=0,1$ if the latter data concern a combined processing of a radar scan and the generation of a persistence radian; $CD_{3,4}=1,0$ if these data only concern the generation of persistence scans. Control circuit 23 determines bit $CD_5$ after receiving signals $(N_1,N_2)$ and a signal $L_{ref}$, bit $CD_5$ is to prevent that, in case the same x,y cell is addressed by two successive radar scans and hence by two successive persistence scans, the brightness level of this cell is reduced twice. This issue will be further discussed below.

Figure 2:
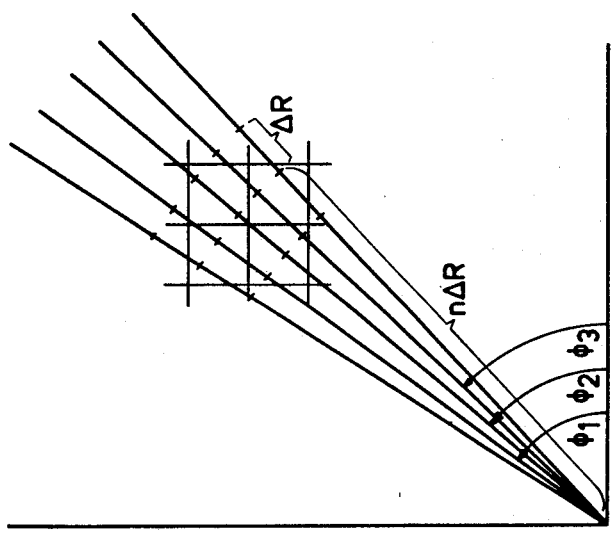

FIG. 2 illustrates a number of radar scans where, for the part of the scans situated near the origin, addresses of points of successive scans expressed in Cartesian coordinates may be equal; for instance:

$$x=(n-1)\Delta R \cos\phi_1=(n-1)\Delta R \cos\phi_2=(n-1)\Delta R \cos\phi_3 \text{ and}$$

$$y=(n-1)\Delta R \sin\phi_1=(n-1)\Delta R \sin\phi_2=(n-1)\Delta R \sin\phi_3.$$

The error made by this equalisation would imply that, without taking countermeasures, the brightness data of the memory cells corresponding with parts of the scans situated near the origin and hence those of the persistence scans would be changed at or after successive scans, whereas the brightness data of the cells corresponding with parts of the scans situated at a distance from the origin would be changed at the frequency determined by $N_1$ or $N_2$. To prevent such an error an "administration" bit is added to each cell of memory 1. The administration bit indicates that a memory cell is describing a persistence scan, which may or may not be combined with a radar scan, has already been addressed. The administration bit is compared with bit $CD_5$ from control circuit 23; the latter bit assumes the values 0, 1, 0, 1, . . . alternately for the persistence scans generated in the pulse repetition time. In case of unequivalence of the administration bit and bit $CD_5$ the brightness data of the cell is changed and the administration bit is made equal to bit $CD_5$. At or after a following scan the same persistence scans are again generated with the same bits $CD_5$. If now the same memory cells are covered as at or after the previous scan, the administration bit and bit $CD_5$ will already be equal for each of these cells, and the brightness data in the memory will not be subject to another change unless the brightness level of the video signal supplied in the last scan is greater than that of the video signal at the previous scan, the brightness data of the latter video signal already being stored in the memory.

Figure 3A:
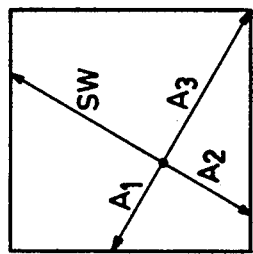
FIGS. 2 and 3A, 3B are diagrams useful in explaining certain properties of the digital scan converter.
Figure 3B:
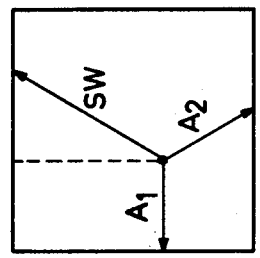

FIG. 3A illustrates a radar scan SW and persistence scans $A_1$, $A_2$ and $A_3$. If a persistence scan is generated simultaneously with the processing of the radar scan, $N_1=4$. The persistence scans are described at angles $k.\Delta\phi=\frac{1}{2}\pi$, where $k=0, 1, 2$ and 3. If for scan SW the bit $CD_5=1$ and the administration bit of a cell covered by scan SW equals 0, the brightness data will be changed and the administration bit becomes 1. After a period, corresponding with a quarter of an antenna revolution, the particular cell is covered by persistence scan $A_1$; for this scan $CD_5=0$. There is again unequivalence between $CD_5$ and the administration bit; the brightness data is again changed and the administration bit turns 0 again. Thus after half an antenna revolution with the generation of persistence scan $A_2$, for which $CD_5=1$, the administration bit returns to 1; after three quarters of an antenna revolution with the generation of persistence scan $A_3$, for which $CD_5=0$, the administration bit turns 0 again; after a complete antenna revolution with the generation of the next radar scan, for which $CD_5=1$, the administration bit turns 1 again, etc. This process will however come to a deadlock in the case of the situation shown in FIG. 3B. If a persistence scan is generated simultaneously with the processing of radar scan SW and thereafter the persistence scans $A_1$ and $A_2$, then $N_1=3$. The persistence scans are generated at angles $k.\Delta\phi=\frac{2}{3}k\pi$, where $k=0, 1$ and 2. If again for scan SW the bit $CD_5=1$ and the administration bit of a cell covered by this scan is 0, the brightness data will be changed and the administration bit becomes 1. After one third of an antenna revolution with the generation of persistence scan $A_1$, for which $CD_5=0$, the administration bit is 0; after two thirds of an antenna revolution with the generation of persistence scan $A_2$, for which $CD_5=1$, the administration bit is 1. However, after a complete antenna revolution with the generation on the next scan SW, the bit $CD_5$ is again 1. Bit $CD_5$ is already equal to the administration bit and hence the brightness data is not changed. This undesired situation is prevented by changing bit $CD_5$ each antenna revolution in the cases when an odd number of persistence scans must be generated in the pulse repetition time. To achieve this, a reference signal $L_{ref}$ is derived from the angular value of the adding circuit 12, using an angle reference circuit 24. Signal $L_{ref}$ changes bit $CD_5$ in the control circuit 23 each antenna revolution.

FIG. 2 also shows that two successive points of radar scans can cover the same memory cell; for instance:

$$x=n\Delta R \cos \phi_2 = (n+1)\Delta R \cos \phi_2 \text{ and } y=n\Delta R \sin \phi_2 = (n+1)\Delta R \sin \phi_2.$$

The error made with this equalisation would imply that, without taking countermeasures, the brightness data of the same cell would be changed twice in successive range increments. To prevent this error, a comparator 25 is incorporated and the delay time of element 18 is made equal to the time in which a radar signal passes through a range increment $\Delta R$ twice. Comparator 25 determines whether the stronger of the video signals is in range increment n or in range increment n+1. Bits $CD_{0-5}$ and the x, y address information of the range increment that contains the weaker video signal are blocked, while bits $CD_{0-5}$ and the (same) x, y address information of the range increment that contains the greatest video signal are passed to logical unit 7 and memory 1 respectively. Buffer register 20 can be blocked to this effect by a control signal from blocking circuit 26. In the address conditional circuit 27, connected to address register 14, the x, y addresses of each two successive range increments are compared; in case of equivalence a signal indicative of such a situation is supplied to blocking circuit 26 that, depending on the signal from comparator 25, produces said control signal.

We claim:

1. Digital scan converter for a pulse radar apparatus provided with: a random-access memory (1), each cell of which containing brightness data; a circuit (3) connected to the memory (1) for reading out the brightness data and for presenting corresponding video signals on a raster scan display (2) at positions corresponding with the respective cells; a control unit (15) for supplying persistence data and address information to process the persistence data; switching means (17) for passing either radar video signals or the persistence data; and a logical unit (7) for supplying, in response to the radar video signals and the persistence data, respectively, and to the brightness data stored in memory (1), new brightness data overwriting that stored in memory (1), whereby the memory positions are determined by an address conversion circuit (10) which converts the radar video addresses and the persistence data addresses established in polar coordinates by the pulse radar apparatus and the control unit (15), respectively, into addresses expressed in Cartesian cordinates, characterised in that, to renew the stored brightness data, either simultaneously with a radar scan or between the generation of two successive radar scans, synchronously with a radar scan in obtaining a desired persistence on the raster scan display (2), the digital scan converter is provided with: a control code circuit (21) for supplying, in response to signals form the control unit (15) determining the conditions for and the frequency of the persistence data processing, a signal to indicate that only a radar scan must be presented on the display, a signal to indicate that simultaneously and in the same sequence therewith persistence data must be processed, or a signal to indicate that only persistence data must be processed in the same sequence as a radar scan; and a control code register (19) in which the signals supplied via the switching means (17) are supplemented with the output signals of the control code circuit (21).

2. Digital scan converter as claimed in claim 1, characterized in that the digital scan converter comprises: a delay element (18) which functions to relay the data passed through said switching means (17) to the control code register (19); a comparator (25) connected to the input and the output of said delay element (18), which comparator (25) functions to establish the greatest value assumed by said data in two successive range increments; and a blocking circuit (26) connected to both the comparators (25) and an address conditional circuit (27), whereby the address conditional circuit (27), in response to the memory addresses supplied by the address conversion circuit (10) in Cartesian coordinates, establishes that the same memory address expressed in Cartesian coordinates belongs to the addresses of two consecutive range increments expressed in polar coordinates, whereupon the blocking circuit (26) supplies a signal to pass only the contents of the control code register (19) containing said largest value to the logical unit (7).

3. Digital scan converter as claimed in claim 1 or 2, characterized in that the control code circuit (21) comprises a control circuit (23) whose output signal is changed in value each time when new persistence data is processed in the pulse repetition time, which output signal is stored in the control code register (19), and that the logical unit (7) comprises a comparator comparing the signal from the control circuit (23) with an administration bit added to each memory cell to indicate whether the brightness data stored in the respective memory cell has been adapted to the received persistence data, which comparator changes the value of the administration bit with each adaptation performed.

4. Digital scan converter as claimed in claim 3, characterized in that the digital scan converter comprises an angle reference circuit (24) connected to the address conversion circuit (10), which angle reference circuit functions to supply a signal to the control circuit (23) when the address conversion circuit azimuth output reaches a present value, which signal causes the output signal of the control circuit (23) to be inverted each antenna revolution if in the pulse repetition time the processing of persistence data occurs an odd number of times.

* * * * *